US006544722B2

(12) United States Patent
Bouwstra et al.

(10) Patent No.: US 6,544,722 B2
(45) Date of Patent: Apr. 8, 2003

(54) PROCESS FOR THE PREPARATION OF POLYMER LAMINATED BASE PAPER AND POLYMER LAMINATED PHOTOGRAPHIC BASE PAPER OBTAINABLE BY SAID PROCESS

(75) Inventors: Jan Bastiaan Bouwstra, Bilthoven (NL); Ieke de Vries, Kaatsheuvel (NL)

(73) Assignee: Fuji Photo Film B.V., Tilburg (NL)

( * ) Notice: Subject to any disclaimer, the term of this patent is extended or adjusted under 35 U.S.C. 154(b) by 0 days.

(21) Appl. No.: 09/798,773

(22) Filed: Mar. 2, 2001

(65) Prior Publication Data

US 2001/0028995 A1 Oct. 11, 2001

(30) Foreign Application Priority Data

Mar. 3, 2000 (EP) ........................................... 00200764

(51) Int. Cl.[7] ............................ G03C 1/74; G03C 1/79; G03C 11/22; B05D 3/02; B32B 31/00

(52) U.S. Cl. ........................ 430/349; 430/532; 430/533; 430/535; 430/536; 430/538; 430/935; 156/244.17; 156/244.23; 156/272.2; 156/273.3; 156/309.9; 156/322; 427/316; 427/326; 427/557

(58) Field of Search ................................ 430/532, 538, 430/935, 349, 536, 533; 156/272.2, 273.3, 309.9, 322, 244.17, 244.23; 427/316, 326, 557

(56) References Cited

U.S. PATENT DOCUMENTS

| | | | | |
|---|---|---|---|---|
| 5,182,161 A | | 1/1993 | Noda et al. | 430/538 |
| 5,455,073 A | * | 10/1995 | Dethlefs et al. | 430/538 |
| 5,503,968 A | * | 4/1996 | Lee | 430/532 |
| 5,824,463 A | * | 10/1998 | Arrington | 430/532 |
| 6,030,742 A | * | 2/2000 | Bourdelais et al. | 430/538 |
| 6,087,079 A | * | 7/2000 | Newberry et al. | 430/538 |
| 6,335,102 B1 | * | 1/2002 | Tsubaki et al. | 430/438 |

FOREIGN PATENT DOCUMENTS

| | | |
|---|---|---|
| DE | 198 21 446 | 11/1999 |
| EP | 0 573 753 | 12/1993 |
| JP | 59 031116 | 2/1984 |
| JP | 57 102622 | 6/1992 |

OTHER PUBLICATIONS

European Search Report, Jun., 2000.

* cited by examiner

*Primary Examiner*—Richard L. Schilling
(74) *Attorney, Agent, or Firm*—Merchant & Gould, P.C.

(57) ABSTRACT

The invention is directed to a process for the preparation of polymer laminated base paper, said process comprising laminating a base paper web on at least one side thereof with at least one polymer layer by extrusion-coating at a coating speed of 300 m/min or more, wherein the said base paper web is heated prior to laminating.

12 Claims, 1 Drawing Sheet

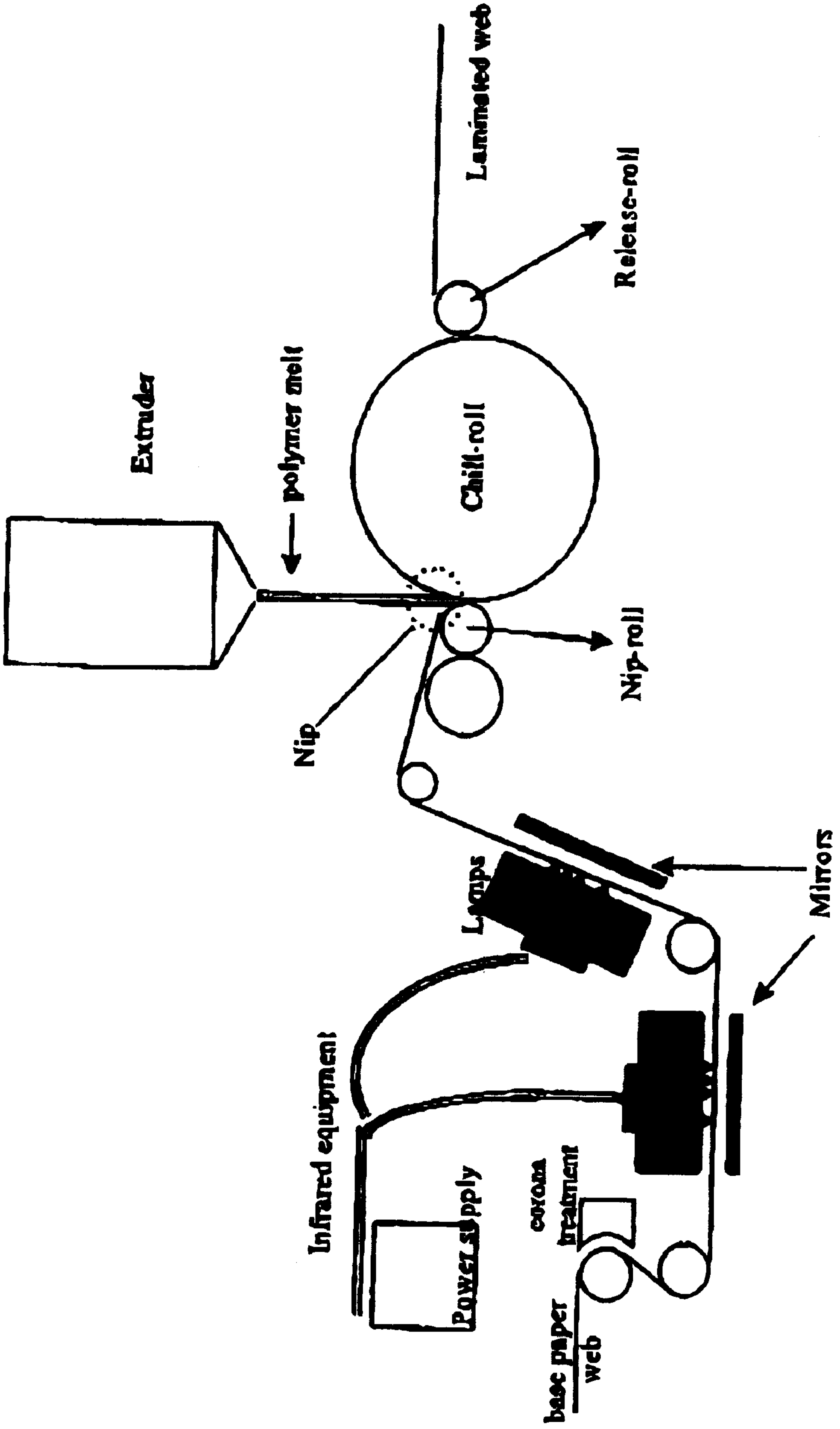
Laminated web
Release-roll
Extruder
polymer melt
Chill-roll
Nip-roll
Nip
Mirrors
Lamps
Mirrors
Infrared equipment
Power supply
corona treatment
base paper web

PROCESS FOR THE PREPARATION OF POLYMER LAMINATED BASE PAPER AND POLYMER LAMINATED PHOTOGRAPHIC BASE PAPER OBTAINABLE BY SAID PROCESS

The invention is directed to the preparation of polymer laminated base paper and more in particular to the preparation of polymer laminated photographic base paper.

Polymer laminated base paper for photographic printing paper is conventionally prepared from a base paper that is laminated with at least one polymer resin layer, usually a titanium dioxide filled polyethylene, polypropylene or a polymethylene-methacrylate resin, by extrusion-coating (or co-extrusion-coating) of a polymer melt onto the surface of the base paper.

In JP-A 57-102622 a process is described for the extrusion-coating of a base paper with polyethylene, in which process the base paper is subjected to a corona treatment, followed by heating to a temperature of at least 80° C. This process aims at improving the adhesion between base paper and polymer coating.

An important aspect of the quality of polymer resin laminated base paper is the resin surface appearance, which should not have a large number of crater-like defects (or pits) after extrusion-coating of the polymer resin on the base paper.

Further important aspects of photographic base paper are the speed of production and the thickness of the polymer layers. Both aspects are important in view of the economy of the process of producing photographic print paper. The formation of pits has turned out to be strongly dependent on those aspects.

It has been attempted to suppress the number of pits by increasing the thickness of the polymer resin layer. At high extrusion-coating speeds, such as over 300 m/min this is not sufficiently effective, unless very large amounts of polymer are used. Furthermore, it has economical disadvantages as the polymer resin is an important cost factor in the production of photographic print paper.

At extrusion-coating speeds of the polymer resin of 300 m/min or more it has been found to be much more difficult to reduce the number of pits.

In the art of providing polymer laminated photographic base paper there is a need for high speed production, especially during the extrusion-coating of the paper with the polymer resin, whereby the amount of pits remains at a sufficiently low value.

Accordingly it is an object of the present invention to provide a process for the preparation of a polymer laminated base paper, more in particular a polymer laminated photographic base paper, wherein the number of pits is decreased, especially at higher extrusion-coating speeds.

It is a further object of the invention to provide a process for the preparation of a polymer laminated base paper, more in particular a polymer laminated photographic base paper, wherein the number of pits is decreased, at higher extrusion-coating speeds, without the need to increase the polymer weight.

The present invention is based thereon, that the coated paper shows less pits in case the base paper web is heated, preferably by infrared radiation, prior to the extrusion coating with the polymer resin.

Accordingly the present invention is directed to a process for the preparation of polymer laminated base paper, said process comprising laminating a base paper web on at least one side thereof with at least one polymer layer, by extrusion-coating at a coating speed of 300 m/min. or more, wherein the said base paper web is heated prior to laminating.

Surprisingly it has been found that with this process the number of pits can be reduced, even at high extrusion-coating speeds, such as extrusion-coating speeds in excess of 300 m/min. The advantages of the invention become apparent already at extrusion speeds of 300 m/min or over. It is preferred to use a speed of at least 350 m/min, more in particular at least 400 m/min. Presently an upper limit of 700 m/min is considered acceptable.

In the broadest sense the present invention resides therein that the paper web is heated just prior to the (co-)extrusion-coating. This heating can be done by the application of heated air, heated rollers and/or by radiation. More in particular, preference is given to the use of radiation in the Near Infra Red (NIR) region. In particular, it is to be noted that the NIR radiation can be emitted at radiation temperatures of over 2500 K, preferably over 2900 K, most preferred over 3000 K. Generally, the upper limit for the emission temperature is 3500 K.

It has been found that surprisingly the use of NIR radiation provides good results in terms of product properties. Further, it has been found that in terms of heating rate the use of NIR has advantages.

The advantages of the treatment of the web by infrared radiation, with wavelength ranges between 0.8 $\mu$m and 1 mm, results in the increase of the web temperature in an extremely short treatment period, usually less than 1 second. With the use of conventional heating technologies this is less easy too achieve. The fastest temperature increase can be realised with NIR radiation of a wavelength between 0.8 and 1.5 $\mu$m. Advantages of this method are that it is contactless, eliminating the risk of mechanical damage as in case of the use of heated rollers and is highly flexible as the heating power can continuously and immediately be adapted to process needs, such as varying laminating speed, with temperature controlling devices which control the surface temperature.

In the heating step prior to the extrusion-coating the temperature of the paper is preferably raised to a value of at least 30° C., preferably to a value between 30 and 125° C. More in particular the upper limit of the temperature of the web is 90° C. In case energy consumption is a consideration, the temperature may be kept at a value of less than 80° C. without negative effects.

The extrusion-coating can be done with one layer of polymer or with a combination of polymer layers by co-extrusion. The paper web can be coated on one side or on both sides, the latter embodiment having preference. The polymers to be used for the extrusion-coating are the conventional polymers used in paper coating, more in particular in the preparation of photographic base paper. Examples are polyolefins, polyacrylates or polyesters. More in particular, the coating is done using low-density polyethylene, high density polyethylene and blends thereof. The amount of polymer coating depends on the required properties of the laminated base paper, such as stiffness, gloss, number of pits and the like. More in particular the amount is preferably not more than 50 $g/m^2$, more preferably between 25 and 50 $g/m^2$.

The heating step can be incorporated in an extrusion-coating Line for paper. It is to be noted that in case of the use of more than one layer of polymer resin it is possible to use co-extrusion. The term 'extrusion' is therefor intended to include also co-extrusion.

In the extrusion line also other treatments of the paper web can be used such as corona treatment, ozone treatment, flame-treatment and plasma treatment, which treatments all aim at improving the adhesion of the polymer melt to the base paper web.

The invention is now elucidated on the basis of the attached FIGURE. In this FIGURE an extrusion-coating line has been shown. The base-paper web is fed, via a number of rollers, past a corona treatment, via the nip-roll to the nip-zone. The polymer melt and the base paper web come together in the nip. The polymer melt is then cooled on the chill-roll and is released from the chill-roll at the release-roll, from where it is transported further.

Between the corona treatment and the nip-roll, NIR radiation equipment is installed. In order to get a very good efficiency, the infra-red radiation is provided from one side and a radiation mirror is provided on the other side. It is also possible to install the NIR-radiation equipment before the corona treatment.

It is to be noted that the present figure shows lamination on only one side of the paper web. In case lamination on both sides has to be provided, the partly laminated paper web can be laminated on the other side in a comparable co-extrusion line. It is also possible to include a second extruder and, if necessary, suitable radiation equipment in this line.

The invention is now elucidated on the basis of the Example.

EXAMPLE

Two paper substrates were used for testing. These substrates, or base papers, represent a range of base paper qualities as can be found in the market. Paper substrate '1' represents a good quality in relation to the number of pits. Paper substrate '2' represents a lower quality.

The web width of the substrates was 47 cm. The substrates were first extrusion coated with 21.0 g/m2 transparent polyolefin resin film on the backside at a line speed of 200 m/min.

Before extrusion-coating of the topside, the substrate was pre-treated with corona and subsequently preheated with NIR radiation up to a temperature of 39° C. or 83° C. The treating width of the NIR-equipment covered 24 cm in the centre of the total web width of 47 cm. For the pre-treatment two NIR-units were used. After the on line pretreatments (Corona and preheating) the substrate was extrusion coated at the topside with a polyolefin resin LDPE of 28 g/m2 (containing metaloxide, dyes, coloured pigments, optical brighteners and the like) at a speed of 400 m/min. The hotmelt (temperature 326° C.) was nipped (pressure 6 bar) between the substrate and a cooling chill-roll. Because of the NIR-pretreatment the crater like defects or so-called pits defects decreased in comparison to the samples which received no heat pretreatment (remaining at room temperature). The NIR-pretreatment shows no disadvantage in the number of releasing defects, when the extrusion coated web releases from the cooling chill-roll.

The following test results are obtained which shows the effectivity of the heat pretreatment in order to reduce the number of pits defects:

| | Paper type 1 Number of pits per 4 mm$^2$ | | Paper type 2 Number of pits per 4 mm$^2$ | |
|---|---|---|---|---|
| | (800–1200 $\mu m^2$) | (>1200 $\mu m^2$) | (800–1200 $\mu m^2$) | (>1200 $\mu m^2$) |
| No NIR treatment (23° C.) | 9.3 | 2.3 | 22.3 | 9.3 |
| NIR treatment (39° C.) | 1.7 | 0.3 | 14.3 | 5.0 |
| NIR treatment (83° C.) | 2.0 | 1.3 | 9.7 | 1.3 |

In the example the following methods were used to determine the various parameters:

Pits Olympus microscope, measure area of 4 mm$^2$

Web temperature: Minolta Land temperature meter.

These results show that for the lower quality base paper type, a significant reduction of the number of pits can be realised, even at temperatures as high as 83° C. With a good quality of base paper also a significant reduction of the number of pits is realized.

What is claimed is:

1. A process for the preparation of polymer laminated base paper comprising:

heating a base paper web to a temperature from about 30° C. to about 125° C. using near-infrared radiation; and laminating said base paper web on at least one side thereof with at least one polymer layer by extrusion-coating at a coating speed of at least 300 m/min.

2. The process according to claim 1, wherein said coating speed is at least 400 m/min.

3. The process according to claim 1, wherein said coating speed is not more than 700 m/min.

4. The process according to claim 1, wherein said near-infrared radiation is emitted at temperatures greater than 2500 K.

5. Process according to claim 1, wherein the base paper web is extrusion-coated on both sides.

6. Process according to claim 1, wherein said polymer layer is a polyolefin, a polyacrylate or a polyester.

7. Process according to claim 1, wherein the temperature is not more than 90° C.

8. Process according to claim 1, wherein said base paper web is subjected to one or more additional treatments, prior to extrusion-coating.

9. Process according to claim 8, wherein said one or more additional treatments comprise corona treatment, ozone treatment, flame treatment, plasma treatment, or a combination thereof.

10. Process according to claim 1, wherein said base paper is a polymer laminated photographic base paper.

11. Process according to claim 10, wherein said base paper is provided with at least one layer of a photographic emulsion.

12. Process according to claim 11, wherein said base paper is provided with at least one layer of a gelatin sublayer between the polymer coating and the photographic emulsion.

* * * * *